United States Patent
Kuhlmann et al.

(10) Patent No.: US 9,146,107 B2
(45) Date of Patent: Sep. 29, 2015

(54) ROTATION RATE SENSOR AND METHOD FOR OPERATING A ROTATION RATE SENSOR

(71) Applicants: Burkhard Kuhlmann, Reutlingen (DE); Jan-Timo Liewald, Lichtenstein (DE)

(72) Inventors: Burkhard Kuhlmann, Reutlingen (DE); Jan-Timo Liewald, Lichtenstein (DE)

(73) Assignee: ROBERT BOSCH GMBH, Stuttgart (DE)

(*) Notice: Subject to any disclaimer, the term of this patent is extended or adjusted under 35 U.S.C. 154(b) by 342 days.

(21) Appl. No.: 13/718,173

(22) Filed: Dec. 18, 2012

(65) Prior Publication Data
US 2013/0174661 A1  Jul. 11, 2013

(30) Foreign Application Priority Data
Jan. 5, 2012 (DE) .......................... 10 2012 200 132

(51) Int. Cl.
*G01C 19/56* (2012.01)
*G01C 19/5719* (2012.01)
*G01C 19/5712* (2012.01)

(52) U.S. Cl.
CPC ............ *G01C 19/56* (2013.01); *G01C 19/5712* (2013.01); *G01C 19/5719* (2013.01)

(58) Field of Classification Search
CPC ............... G01C 19/5719; G01C 19/56; G01C 19/5607; G01C 19/5649; G01C 19/5642; G01C 19/5663; G01C 19/5635
USPC ................. 73/504.12, 504.14, 504.02, 504.04
See application file for complete search history.

(56) References Cited

U.S. PATENT DOCUMENTS

| 6,752,017 | B2 |   | 6/2004  | Willig et al. |           |
|-----------|----|---|---------|---------------|-----------|
| 7,617,728 | B2 | * | 11/2009 | Cardarelli    | 73/504.16 |
| 8,261,614 | B2 | * | 9/2012  | Hartmann et al. | 73/504.12 |
| 8,443,668 | B2 | * | 5/2013  | Ohms et al.   | 73/504.12 |
| 8,683,863 | B2 | * | 4/2014  | Classen et al. | 73/504.14 |
| 8,844,357 | B2 | * | 9/2014  | Scheben et al. | 73/504.12 |
| 8,875,575 | B2 | * | 11/2014 | Ohms et al.   | 73/504.12 |
| 2010/0064805 | A1 | * | 3/2010  | Seeger et al. | 73/504.12 |
| 2010/0281977 | A1 | * | 11/2010 | Coronato et al. | 73/504.14 |
| 2012/0024059 | A1 | * | 2/2012  | Classen        | 73/504.12 |
| 2013/0104651 | A1 | * | 5/2013  | Li et al.      | 73/504.12 |
| 2013/0167636 | A1 | * | 7/2013  | Coronato et al. | 73/504.12 |

FOREIGN PATENT DOCUMENTS

DE        101 08 196       10/2002
WO     WO 2005/043079     5/2005

* cited by examiner

*Primary Examiner* — Helen Kwok
(74) *Attorney, Agent, or Firm* — Kenyon & Kenyon LLP (57) ABSTRACT

A rotation rate sensor having a substrate including a main extension plane, force transmission elements that are movably fastened on the substrate using detection springs and a seismic mass are provided, the seismic mass being suspended over the force transmission elements, movably relative to the substrate, in such a way that the seismic mass is able to be excited, using a drive unit, to a drive vibration about a drive axis that is parallel to the main extension plane, and in response to the presence of a rotation rate that extends in parallel to the main extension plane and perpendicular to the drive axis, the seismic mass is excitable, as a result of Coriolis forces, to a detection vibration about a detection axis that is perpendicular to the main extension plane, the detection springs being connected to the force transmission elements in the region of the vibrational nodes.

14 Claims, 9 Drawing Sheets

ROTATION RATE SENSOR AND METHOD FOR OPERATING A ROTATION RATE SENSOR

CROSS REFERENCE TO RELATED APPLICATION

The present application claims priority to Application No. DE 10 2012 200 132.8, filed in the Federal Republic of Germany on Jan. 5, 2012, which is incorporated herein in its entirety by reference thereto.

FIELD OF INVENTION

The present invention relates to a rotation rate sensor and a method for operating a rotation-rate sensor.

BACKGROUND INFORMATION

German Application No. DE 101 08 196 A1, for example, describes a rotation rate sensor having Coriolis elements for measuring a rotation rate, which is located perpendicular on the substrate plane of the sensor. The sensor includes a first and a second Coriolis element, which are connected to each other via a spring, and are excited to vibrations parallel to a drive axis, a first and a second detection means detecting a deflection of the first and second Coriolis element parallel to a substrate plane, based on a Coriolis force acting upon the Coriolis elements, so that the difference of a first detection signal of the first detection means and a second detection signal of the second detection means is a function of the Coriolis force, and is consequently also a function of the rotation rate of the rotation rate sensor. The Coriolis elements, in this context, are movably connected via spring elements to a drive frame, and via the drive frame indirectly to the substrate. The spring elements are developed as U springs, which include two spiral springs running parallel to each other, which are firmly connected to each other via a head piece. By the bending of the spiral springs, a deflection is made possible of the drive frame and of the Coriolis element parallel to the substrate plane, as a result of the Coriolis force.

In addition, rotation rate sensors are known which are developed for the detection of a rotational rate extending parallel to the substrate plane. Such a rotation rate sensor is described in International Patent Publication No. WO 2005/043079 A2, for example. This rotation rate sensor has a similar functional principle, the Coriolis elements being driven to a drive vibration about a drive axis extending parallel to the main extension plane and perpendicular to the rate of rotation, and are then deflected to execute detection vibrations about a detection axis that is perpendicular to the substrate plane, based on the Coriolis forces.

In all the rotation rate sensors named, the drive vibration and the detection vibration are not completely separable from one another, so that, conditioned upon production tolerances, a cross feed comes about of the drive motion into the detection motion. This cross feed unfortunately produces a quadrature signal, whose amplitude is generally higher by a multiple than the actual measuring signal. The quadrature signal has to be suppressed, in a costly manner, by suitable measures during the design of the rotation rate sensor, for instance, by actively connected compensation electrodes, and during the electrical processing of the measuring signal. The main cause of the quadrature signal in micromechanical rotation rate sensors is that the spring elements used for suspending the Coriolis elements and drive means are not able to be processed ideally because of production tolerances. If these spring elements are stressed by forces (for instance, for producing the drive motion), they deflect themselves not only parallel to the attacking force but also orthogonally to this direction (for instance, parallel to the attacking direction), so that a cross feed of the drive motion into the detection motion takes place.

SUMMARY

In contrast to the related art, the rotation rate sensor according to the present invention and the method for operating a rotation-rate sensor according to the present invention have the advantage that the quadrature signal is considerably reduced. This is achieved by having the detection springs connect to the force transmission elements in the area of vibrational nodes.

The force transmission elements advantageously remain almost at rest in the areas of the vibrational nodes, when the seismic mass is excited to the drive vibration, so that a deformation of the detection springs based on the drive vibration is suppressed. In this way, the cross feed of the drive vibration into the detection vibration is suppressed, so that the formation of a quadrature signal is minimized. In particular, an almost force-free and torque-free suspension of the system made up of a seismic mass and force transmission elements on the substrate is achieved. Thus, advantageously no compensation structures or costly signal-conditioning are needed. The detection springs are each particularly connected indirectly or directly to the substrate or to a substrate anchoring arrangement. The rotation rate sensor according to the present invention particularly includes a MEMS component (microelectromechanical system), which is produced in a semiconductor production process. The substrate preferably includes a semiconductor material, especially silicon, which is patterned appropriately to the development of the seismic mass, the detection springs and the force transformation elements. The patterning, in this context, preferably takes place within the scope of a lithography method, an etching method, a depositing method and/or a bonding method.

According to one preferred exemplary embodiment, it is provided that the force transmission elements are connected to the seismic mass, via the spring elements, in such a way that the force transmission elements are excitable to a standing wave having vibrational nodes, by the drive vibration of the seismic mass. In an advantageous manner the force transmission elements are developed in such a way that the force transmission elements are excited to a standing wave by the excitation based on the coupling of the force transmission elements to the seismic mass vibrating in the form of a drive vibration. The standing wave then forms the vibrational nodes which, in comparison to the remaining regions of the force transmission elements remain nearly at rest, so that no bending stress of the detection springs is caused based on the drive vibration cross feeding by the seismic mass onto the force transmission elements. The force transmission elements are preferably coupled to the seismic mass in the area of the drive axis, so that advantageously no translator motions of the force transmission elements are caused perpendicularly to the main extension plane. This favors a rest position of the vibrational nodes.

According to one preferred exemplary embodiment, it is provided that the rotation rate sensor has at least one additional adjacent seismic mass, which is excitable, using an additional drive unit, to an additional drive vibration about an additional drive axis that is parallel to the drive axis, the drive vibration and the additional drive vibration being aligned in phase opposition to each other and the seismic mass and the additional seismic mass being preferably connected to one another by at least one spring region in a spring-elastic manner. Consequently, in an advantageous manner, a differential evaluation of the rotation rate is made possible. The coupling of the seismic mass and the additional seismic mass via the spring region preferably makes possible a restriction in the degrees of freedom of motion, so that the development of additional vibrational modes, and particularly a parasitic parallel mode, are suppressed. The spring region includes, in particular, a region connecting the seismic mass and the additional seismic mass to each other, of reduced material thickness in comparison to the seismic mass and the additional seismic mass, so that the rigidity of the spring region compared to the seismic mass and the additional seismic mass is reduced, and consequently spring-elastic bending of the seismic mass with respect to the additional seismic mass is made possible.

According to one preferred exemplary embodiment, it is provided that the force transmission elements be coupled to the seismic mass via at least one drive spring, the drive spring including a spiral spring, which extends along a sensing direction that is essentially parallel to the rotation rate between the force transmission elements and the seismic mass or between an extension of the force transmission elements and an additional extension of the seismic mass. Furthermore, the drive spring extends parallel to the drive axis. Consequently, a suspension is advantageously achieved of the seismic mass on the force transmission elements, which makes possible the development of the drive vibration of the seismic mass about the drive axis. The drive spring is particularly developed in the manner of a film hinge, indirectly or directly between the seismic mass and the force transmission elements. Into the force transmission elements, in particular via the drive springs, only rotational torques are introduced that lead to the development of the standing wave. Moreover, the drive springs are used, for the detection of the rotation rate, to transmit the detection motion of the seismic mass about the detection axis to the force transmission elements. The leaf springs developed as drive springs are preferably dimensioned in a functional layer of the rotation rate sensor in such a way that the drive springs have no inherent quadrature motion or at least only a minimal one.

According to one preferred exemplary embodiment, it is provided that the detection springs include spiral springs, whose one end region engages with the vibrational nodes of the standing wave on the force transmission elements and whose other end region engages at an anchoring point that is fixed to the substrate, the spiral springs being softer with respect to the bending about a bending axis, that is parallel to the detection axis, than with respect to the bending about a bending axis that is parallel to the main extension plane, the spiral springs being situated preferably essentially radially to the detection axis. In an advantageous manner the detection springs thus make possible a rotation of the force transmission elements about the detection axis as a result of the detection vibration of the seismic mass. At the same time, because of the connection of the detection springs to the vibrational nodes, the creation of a quadrature signal is advantageously suppressed, even though spiral springs as bar springs are basically marred by quadrature.

According to one preferred exemplary embodiment, it is provided that the seismic mass includes a first mass element and a second mass element, the drive axis running between the first and the second mass element, and the first and the second mass element being connected to each other via a connecting spring, and the first and the second mass element preferably each being connected to the force transmission elements via a drive spring. Both the drive springs and the connecting spring are preferably situated between the first and the second mass element. The connecting spring includes in particular a region, connecting the first and the second mass region to each other, of reduced material thickness (perpendicular to the main extension plane), compared to the first and second mass region, so that the rigidity of the connecting spring is reduced compared to the first and the second mass region and/or a subsection of the force transmission elements is able to run between the first and the second mass region without being connected to the subsection. Furthermore, it is conceivable that, in the area of the connecting spring, it functions as drive springs, if the subsection of the force transmission elements is connected to the connecting spring.

According to one preferred exemplary embodiment, it is provided that the rotation rate sensor has a frame, which includes two force transmission elements extending parallel to the sensing direction and at least one intermediate section extending parallel to the drive axis between the two force transmission elements, the intermediate section being preferably situated between the first and the second mass element. In an advantageous manner, a stable structure that is torsionally rigid and compact as to installation space is achieved, made of force transmission elements and seismic mass.

According to one preferred exemplary embodiment, it is provided that the force transmission elements be connected to a detection structure, which is configured to the detection of the detection vibration, the detection structure including detection electrodes that are rigidly connected to the force transmission elements and fixed electrodes, fixed to the substrate, that are associated with the detection electrodes, the detection electrodes preferably being situated essentially parallel to the drive axis or essentially radially to the detection axis. Advantageously, a precise detection is thus achieved of the detection motion for determining the rotation rate.

One additional exemplary aspect of the present invention is a method for operating a rotation rate sensor, the seismic mass being excited to the drive vibration about the drive axis using the drive unit, the drive vibration being coupled into the force transmission elements in such a way that a standing wave is produced in the force transmission elements, and the force transmission elements being fixed to the vibrational nodes of the standing wave using detection springs. Advantageously, the force transmission elements are fixed to the vibrational nodes of the standing wave, so that no bending of the detection springs, caused by the drive vibration, are created, and the formation of quadrature signals is thus suppressed.

According to one preferred exemplary embodiment, it is provided that a detection vibration of the seismic mass about the detection axis, caused by Coriolis forces, is detected capacitively using a detection structure that is rigidly connected to the force transmission elements. Advantageously, a precise measuring is thus enabled of the detection motion for determining the rotation rate.

The leaf springs developed as drive springs are preferably dimensioned in a functional layer of the rotation rate sensor in such a way that the drive springs have no inherent quadrature motion or at least only a minimal one.

Exemplary embodiments of the present invention are explained in greater detail in the following description with reference to the accompanying drawings.

DETAILED DESCRIPTION

In the various figures, identical parts have been provided with the same reference symbols and are therefore usually labeled or mentioned only once.

Figure 1A:
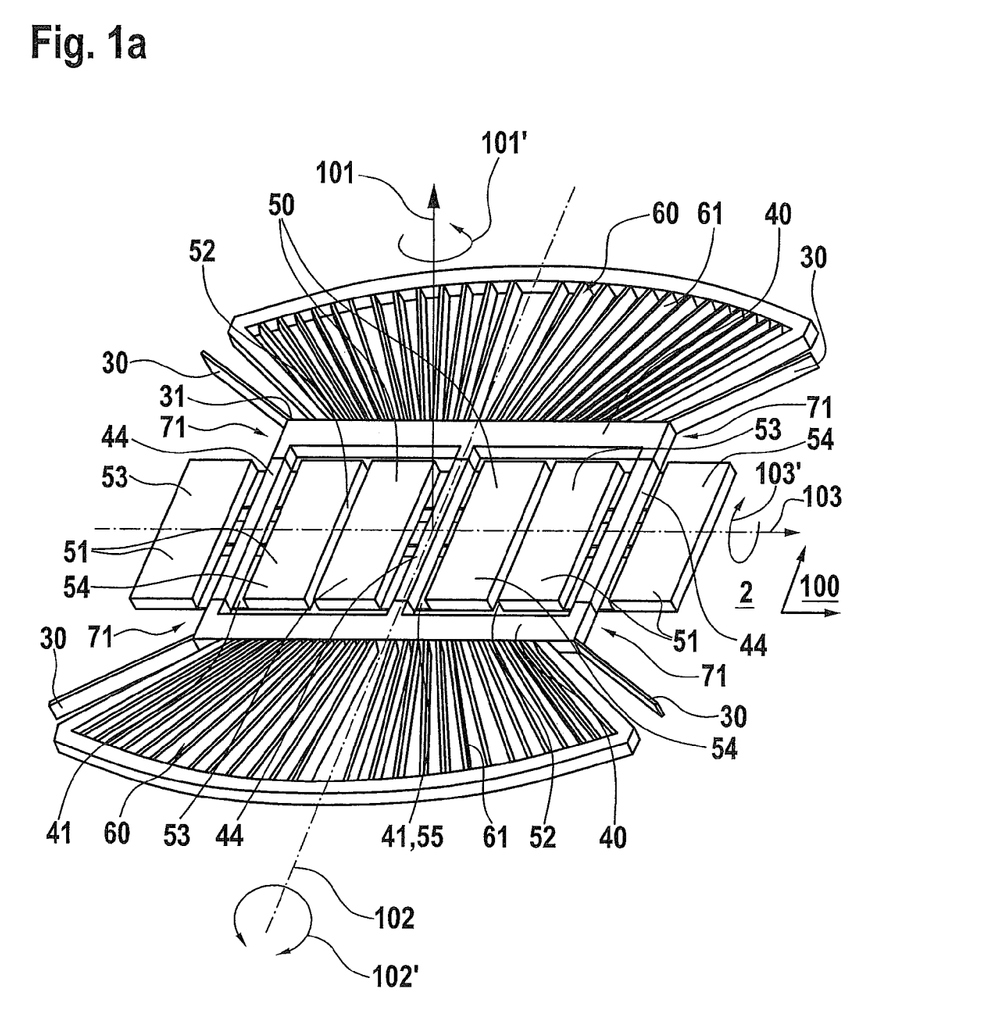
FIGS. 1*a*, 1*b* and 1*c* show schematic views and detailed views of a rotation rate sensor according to a first exemplary embodiment of the present invention.
Figure 1B:
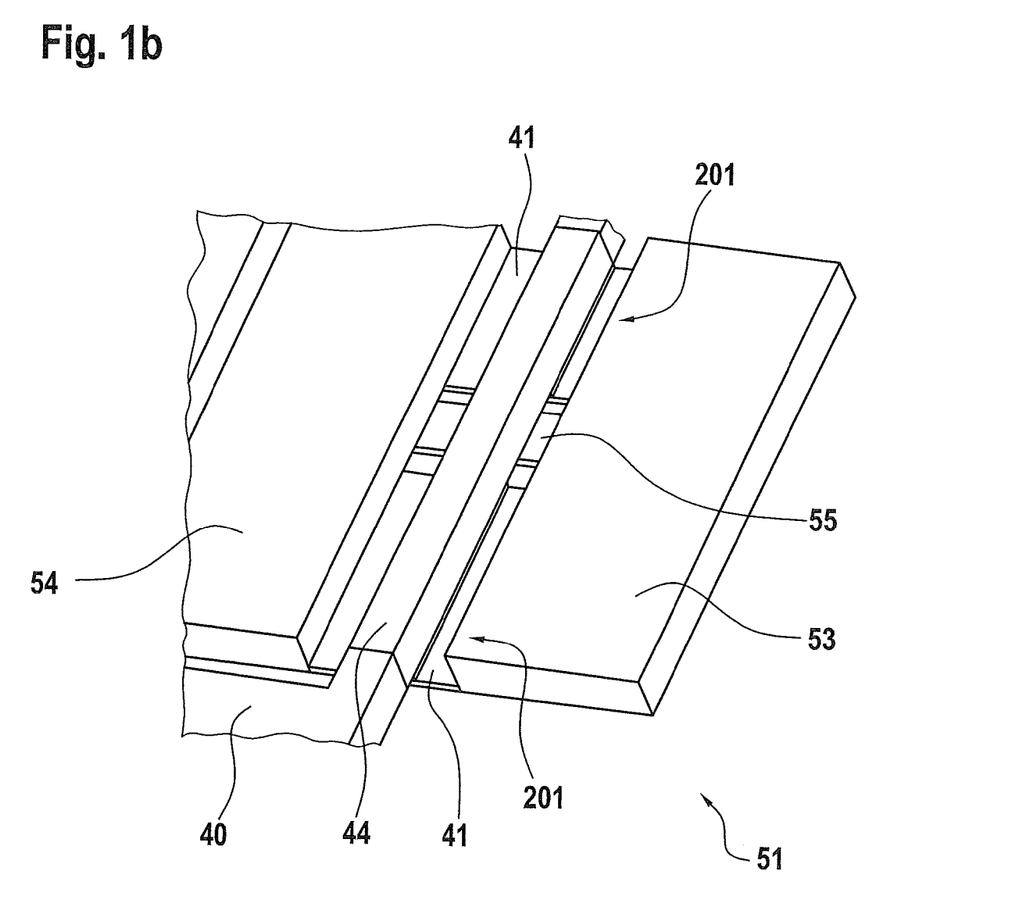
Figure 1C:
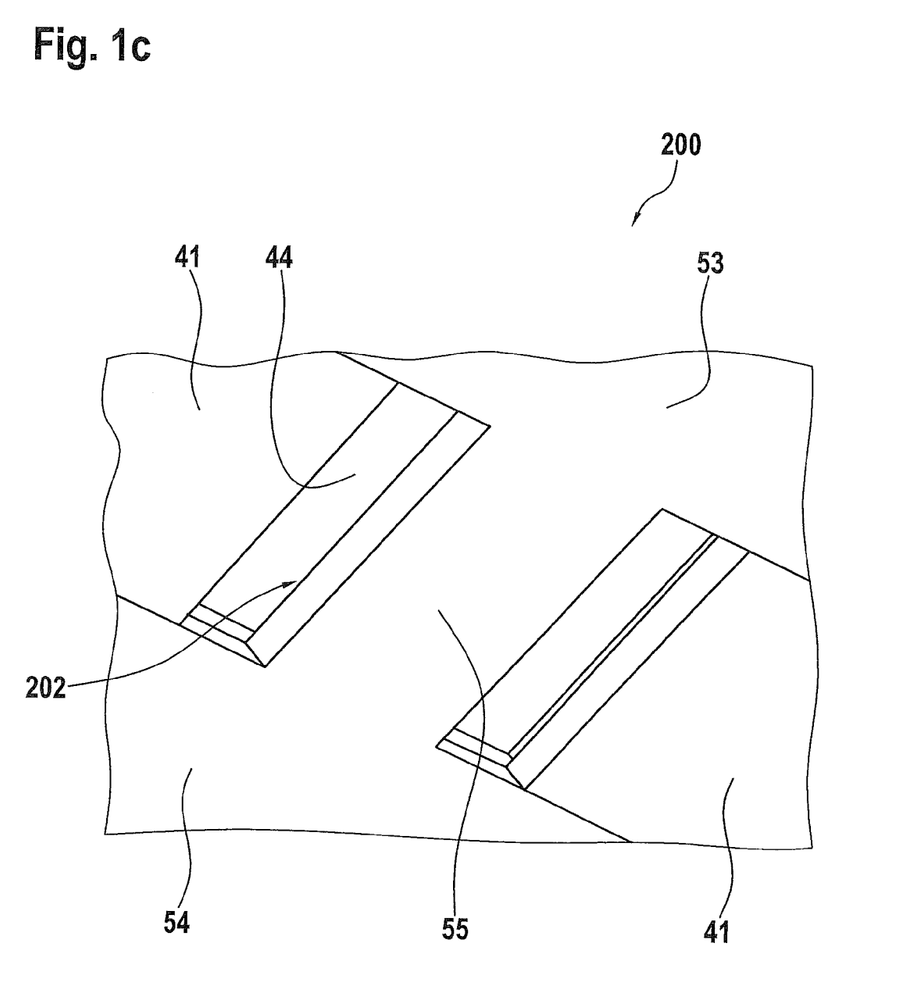

FIGS. 1a, 1b and 1c show schematic views of a rotation rate sensor 1 according to a first exemplary embodiment of the present invention. Rotation rate sensor 1 has a substrate 2 having a main extension plane 100. Substrate 2 preferably includes a silicon substrate, which has been patterned in a semiconductor production process. Rotation rate sensor 1 also has a seismic mass 50 and two additional seismic masses 51, seismic mass 50 being situated between the two additional seismic masses 51. Adjacent seismic mass 50 and additional seismic masses 51 are optionally connected to each other spring-elastically via a common spring region 52. Seismic mass 50 is pivotable about a drive axis that is parallel to main extension plane 100, and is able to be driven about drive axis 102, using a drive unit not illustrated, to perform a drive vibration 102' in the form of a torsional vibration about drive axis 102. Additional seismic masses 51 are able to be driven analogously to perform additional drive vibrations, in each case about an additional drive axis that is parallel to drive axis 102, the additional drive vibration being each in phase opposition to drive vibration 102'.

Rotation rate sensor 1 also has a closed frame, which includes two force transmission elements 40 extending in a straight line and parallel to a sensing axis 103 (running parallel to main extension plane 100 and perpendicular to drive axis 102). The two force transmission elements 40 are connected via three intermediate sections 44 running parallel to drive axis 102. Seismic mass 50 and the two additional seismic masses 51 each include a first mass element 53 and a second mass element 54. First and second mass elements 53, 54 are connected to each other spring-elastically or rigidly via a connecting spring 55. Between the first and the second mass element 53, 54 there runs in each case an intermediate section 44, as well as drive axis 102 and an additional drive axis. First and second mass element 53, 54 are also each connected in addition to intermediate section 44, each via a drive spring 41, and thus to force transmission elements 40. Drive springs 41 include a spiral spring that extends in a planar manner parallel to main extension plane 100, which functions in the manner of a film hinge, and permits drive vibration 102' of seismic mass 50 and the additional drive vibration of additional seismic masses 51 relative to the force transmission elements 40. Force transmission elements 40, in this case, are connected, in the area of drive axis 102 and additional drive axes, to seismic masses 50, 51, so that, of the drive vibrations 102', essentially only corresponding torques are coupled into force transmission elements 40 (illustrated schematically in FIG. 2a). Force transmission elements 40 are dimensioned so that, based on these torques, a standing wave 70 develops in force transmission elements 40 (schematically illustrated in FIG. 2b). Standing wave 70 has vibrational nodes 71, in which force transmission elements 40 are nearly at rest in comparison to the remaining areas of force transmission elements 40.

Rotation rate sensor 1 also has four detection springs 30, which are used for suspending frame on substrate 2. Detection springs 30 are connected for this to force transmission elements 40, in such a way that, in each case, an end region of detection springs 30 engages with force transmission elements 40 in the area of a vibration node 71, while another end region of detection spring 30, facing away from end region 31, is connected indirectly or directly to substrate 2. Based on this positioning of detection springs 30, none of the forces or torques brought about by the drive vibrations are introduced by force transmission elements 40 into detection springs 30, so that detection springs 30 also do not bend as a result of drive vibrations, and the creation of quadrature signals is thus suppressed. At the same time, however, detection springs 30 enable a rotation of frame about a detection axis 101 that runs perpendicularly to main extension plane 100, since detection springs 30 are developed softer, with respect to a bending about bending axis that is parallel to detection axis 101, than with respect to a bending about a bending axis that is parallel to main extension plane 100.

When a rotation rate 103' is present parallel to sensing axis 103, Coriolis forces act upon seismic masses 50, 51, that are vibrating about drive axes 102, about detection axis 101 (schematically illustrated in FIG. 2c), so that frame is excited via drive springs 41 to a detection vibration 101' about detection axis 101. Force transmission elements 40 are each connected to a detection structure 60. Each of the two detection structures 60 includes detection electrodes 61 that are rigidly connected to force transmission elements 40, and corresponding fixed electrodes fixed to the substrate, detection electrodes 61 extending essentially radially about detection axis 101. A detection motion 101' about detection axis 101 thus leads to a change in distance between detection electrodes 61 and the fixed electrodes, which is evaluated capacitively and differentially and used for determining rotation rate 103'.

FIG. 1b shows a detailed view of rotation rate sensor 1 according to the first exemplary embodiment according to FIG. 1a, the detailed view having a seismic mass 51 and an intermediate section 44. In FIG. 1c one may see a center section 200 in which first and second mass elements 53, 54 are connected via essentially rigid connecting spring 55. In this context, connecting spring 55 is not directly connected to intermediate section 44, but is at a distance from intermediate section 44. In side sections 201 that border on center section 200, first and second mass elements 53, 54 are connected, via drive springs 41, directly to each other and to intermediate section 44. In this context, drive spring 41 is particularly developed as a leaf spring. FIG. 1c shows a detailed view of center section 200 illustrated in FIG. 1a. One may see that intermediate section 44 is not directly connected to connecting spring 55, but rather, that in center section 200 a free space 202 is developed between intermediate section 44 and connecting spring 55.

Figure 2A:
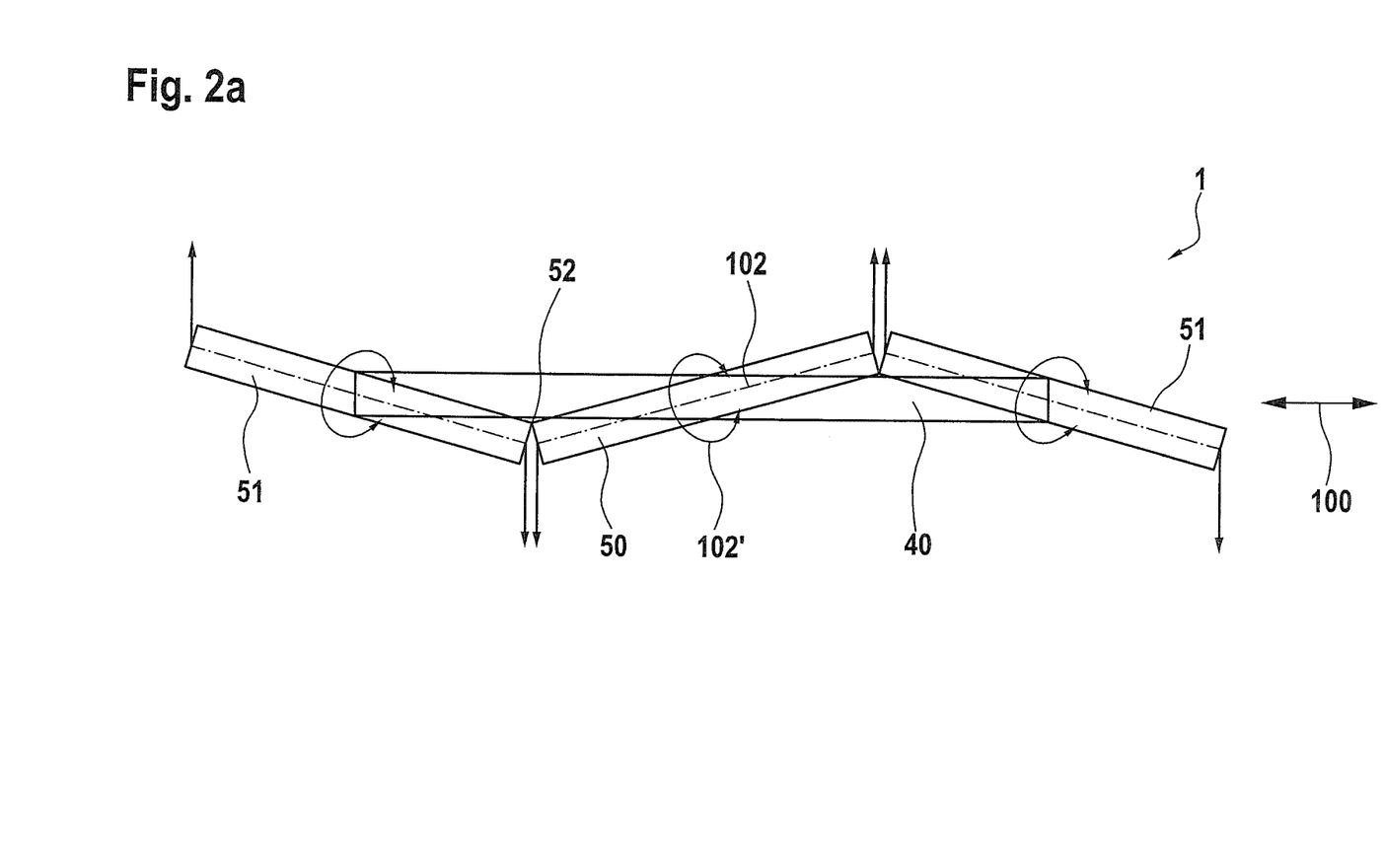
FIGS. 2a, 2b and 2c show schematic views for the illustration of motions of a rotation rate sensor according to a first exemplary embodiment of the present invention.
Figure 2B:
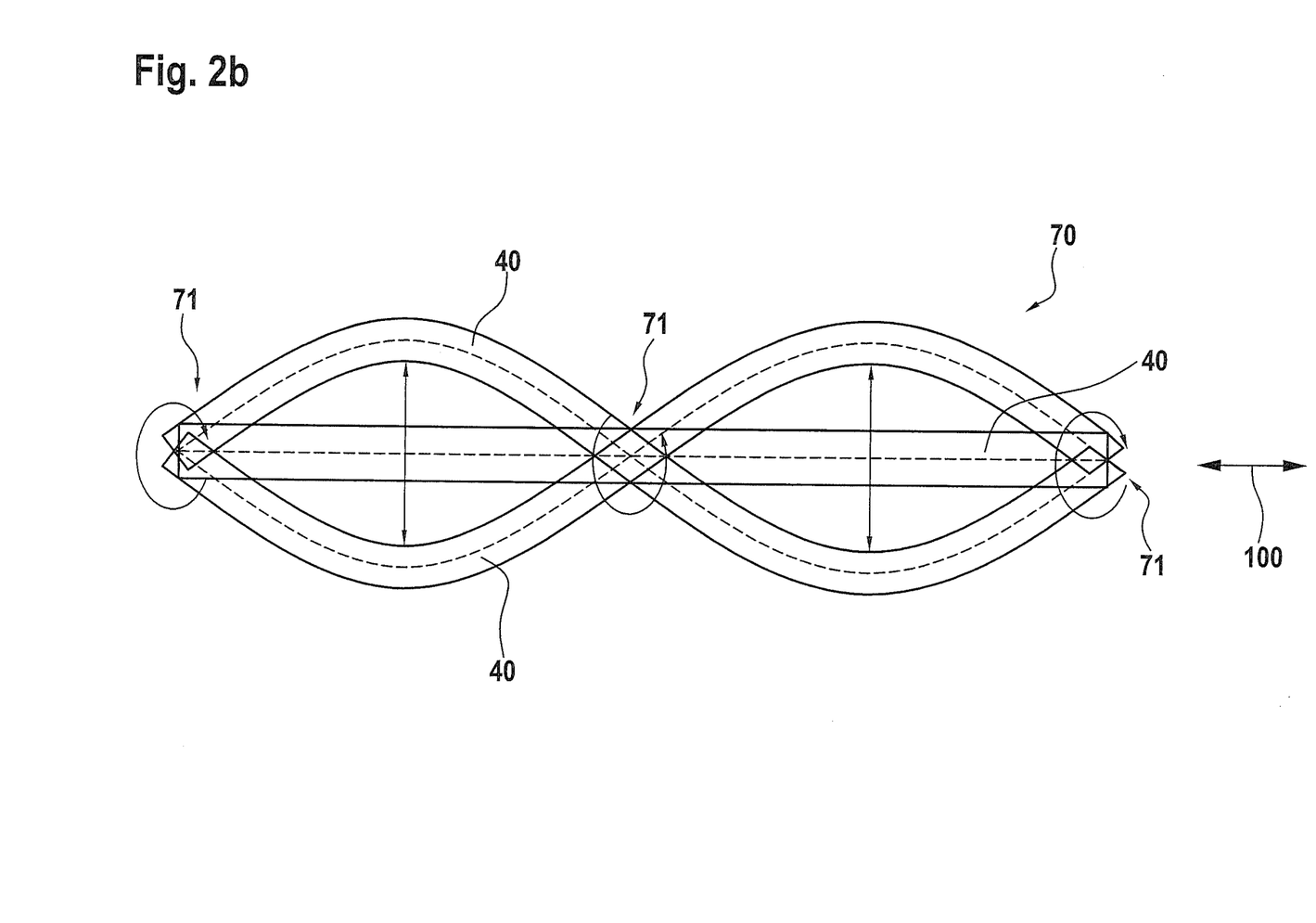

FIGS. 2a, 2b and 2c show views of rotation rate sensor 1 according to the first exemplary embodiment, of the present invention, schematically and simplified, in order to illustrate the manner of functioning and the motions of parts of the rotation rate sensor. Seismic masses 50, 51 are connected to each other by spring regions 52 in such a way that an in-phase motion lies clearly above the resonant frequency of an out of phase motion. Furthermore, drive springs 41 and connecting springs 55 are developed as being quadrature-free in response to the drive vibration, so that these springs do not produce a quadrature signal. The drive vibration is shown in FIG. 2a in a schematic side view. It may be seen that seismic mass 50 vibrates about drive axis 102 and additional seismic masses 51 vibrate out of phase about the additional drive axes. In the centers of rotation, i.e. in the area of drive axes 102 and additional drive axes, force transmission elements 40 are connected to seismic masses 50, 51 via drive springs 41. Seismic masses 50, 51 are capacitively excited to drive vibrations 102', for instance, using a drive unit in the form of plate electrodes between seismic masses 50, 51 and substrate 2 (in the manner of a plate capacitor drive). In force transmission elements 40, a standing wave 70 develops, which is shown schematically in FIG. 2b. Seismic masses 50, 51, force transmission elements 40 and drive springs 41 are developed so that the sum of all the torques and forces coupled into force transmission elements 40 is essentially zero. Consequently, no forces are released to frame which would accelerate it in one direction. However, at each seismic mass 50, 51 a torque is transmitted to force transmission elements 40. In response to a suitable coupling of seismic masses 50, 51 to coupling springs 55, a vibration mode comes about in which these torques do not lead to a pendulum motion but set force transmission elements 40 into vibration. In detail, frame is then exposed to a bending stress by the impressed torques. If force transmission elements 40, in which vibrating seismic masses 50, 51 are anchored, are regarded as bending bars, the bending line of the bar is able to be determined. The solution yields the deformation in the form of standing wave 70 shown in FIG. 2b. Since the torques change in sine shape with the vibrational frequency of drive vibrations 102', the standing wave is created on force transmission elements 40 of frame, having three vibrational nodes 71 and the resulting bending torques of the vibration of force transmission elements 40 compensate for the torques coupled into force transmission elements 40 by seismic masses 50, 51. The amplitude of standing wave 70 is substantially determined by the rigidity of frame, but in the case of suitably selected dimensions, it is clearly below 1% of the amplitude of drive vibration 102'. The suspension of frame takes place by detection springs 30, which, as a rule, have to be implemented as bar springs that are prone to quadrature. The quadrature of rotation rate sensor 1 presented is therefore defined by the drive-proportional motion at detection springs 30. The suspension points for the structure of frame and seismic masses 50, 51 are established by the bending of force transmission elements 40 and lie in vibrational nodes 71, since vibrational nodes 71 remain at rest in response to pure drive motion, and therefore detection springs 30 are no longer stressed by drive-proportional forces. Thereby, the quadrature signal is advantageously negligible, although detection springs 30 are implemented as bar springs (that are subject to quadrature in principle).

Figure 2C:
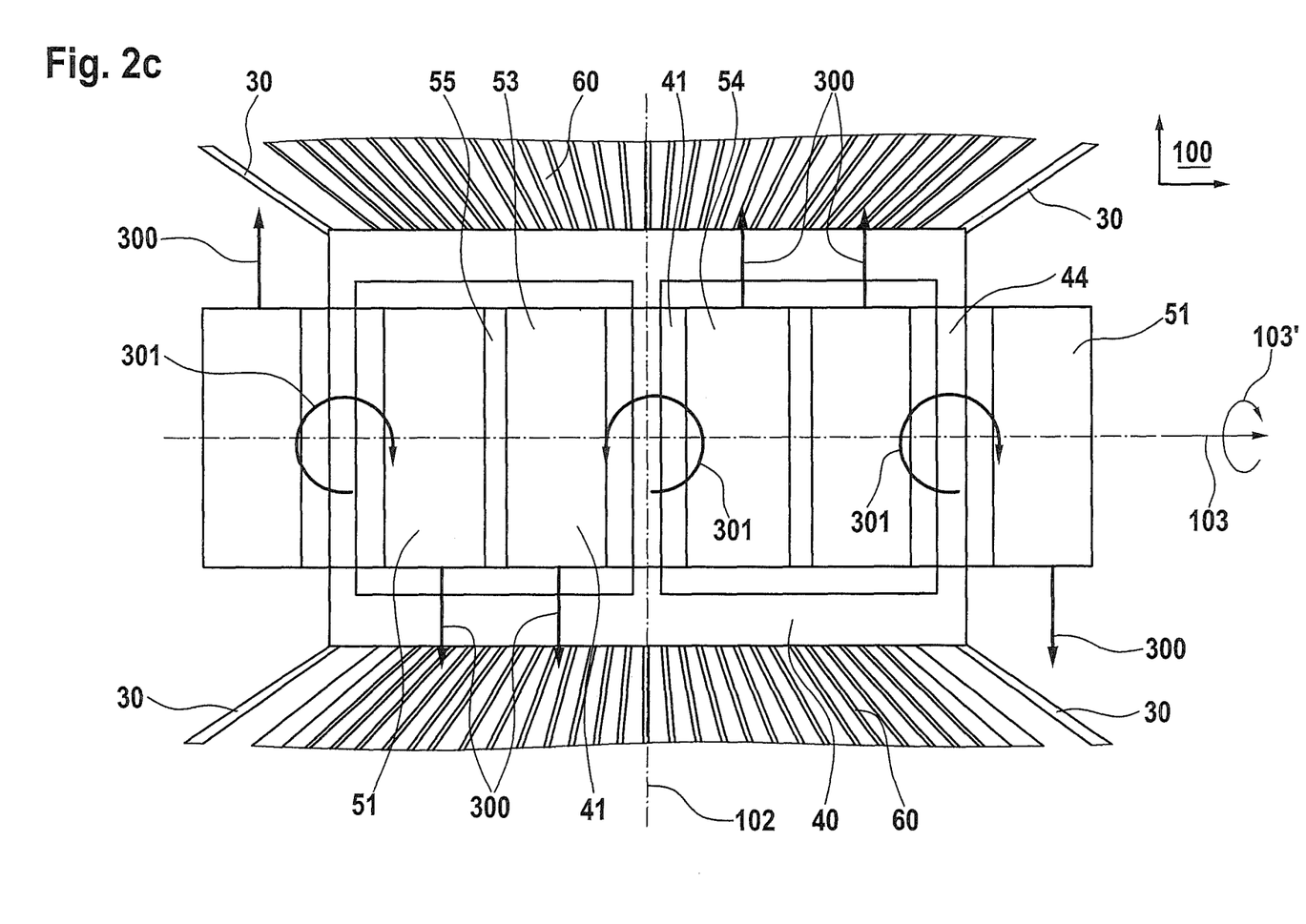

A top view onto rotation rate sensor 1 according to the first exemplary embodiment of the present invention is shown in FIG. 2c. If a rotation rate 103' is present along sensing direction 103, which is superposed on the drive vibrations along the drive axes, Coriolis forces 300 act on seismic masses 50, 51, whereby corresponding torques 301 act upon seismic masses 50, 51 about axes running parallel to detection axis 101. The summation over these torques 301 yields a resulting torque acting on frame, which puts frame into a detection vibration about detection axis 101. This detection vibration is then detected using detection structures 60. In order to obtain a detection signal, coupling springs 55 between seismic masses 50, 51 and/or drive springs 41 have to be developed in such a way that no shearing motions of seismic masses 50, 51 or first and second mass elements 53, 54 against each other are possible and a vibrating mode analogous to the drive motion is suppressed. Then the entire sensor structure reacts with respect to the Coriolis torques as a rigid body, and begins to rotate when rotation rate 103' is present. A maximally rigid design of coupling springs 55 and drive springs 41 along the direction parallel to drive axis 102 leads to a maximum measuring effect. This property is satisfied, for example, by (quadrature-free) drive springs 41 illustrated in FIG. 1b and developed as hinge springs. The direct creation of a quadrature signal by a bending stress of detection electrodes 61 is negligible in rotation rate sensor 1 according to the present invention. A further possible coupling in of a drive-proportional signal, however, is to be expected because of the bending of force transmission elements 40: Detection electrodes 61, fastened to them, move in accordance with the frame bending proportional to the drive motion, and are thus able to introduce an undesired drive-proportional signal. Because of the symmetrical execution of detection electrodes 61 on both sides of force transmission elements 40, however, a compensation of this motion is achieved, the rotational detection motion deflects the two electrode surfaces 61 out of phase, all electrode motions proportional to the drive motion being unidirectional based on the bending of force transmission elements 40 in both detection structures 60 This undesired signal is therefore compensated for by a differential evaluation and does not appear as a rotation rate signal.

Figure 3A:
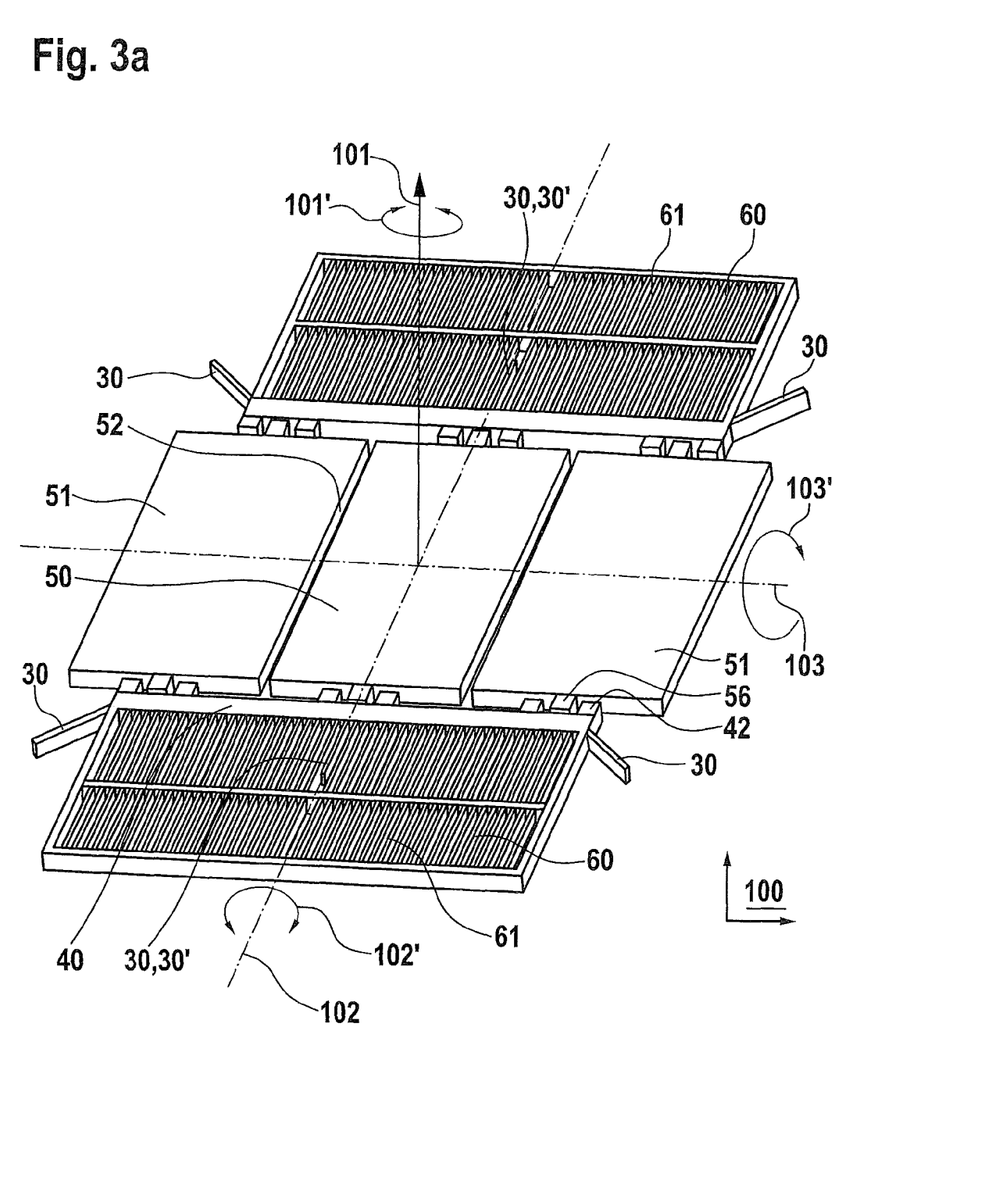
FIGS. 3a, 3b and 3c show schematic views and detailed views of a rotation rate sensor according to a second exemplary embodiment of the present invention.
Figure 3B:
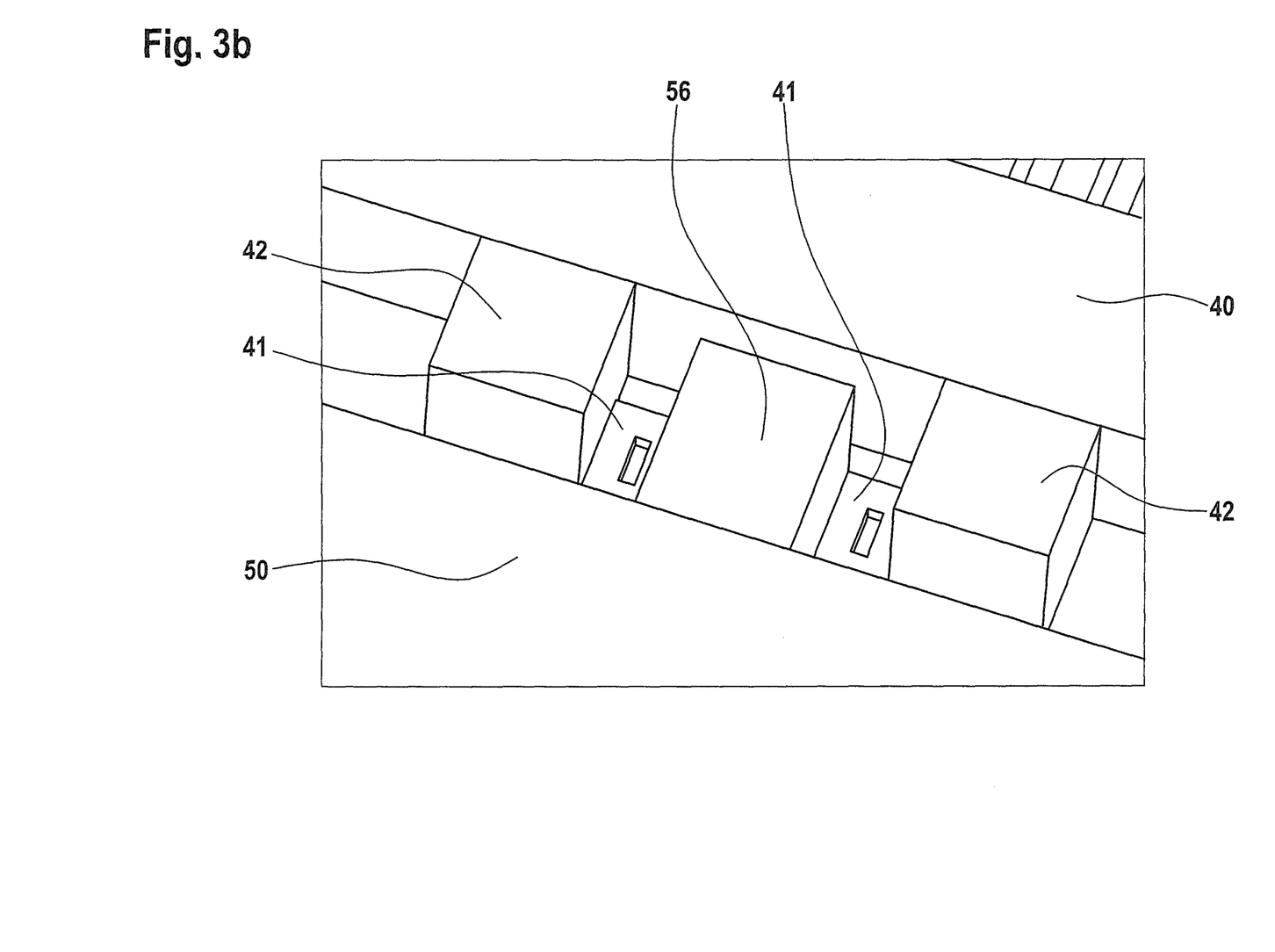
Figure 3C:
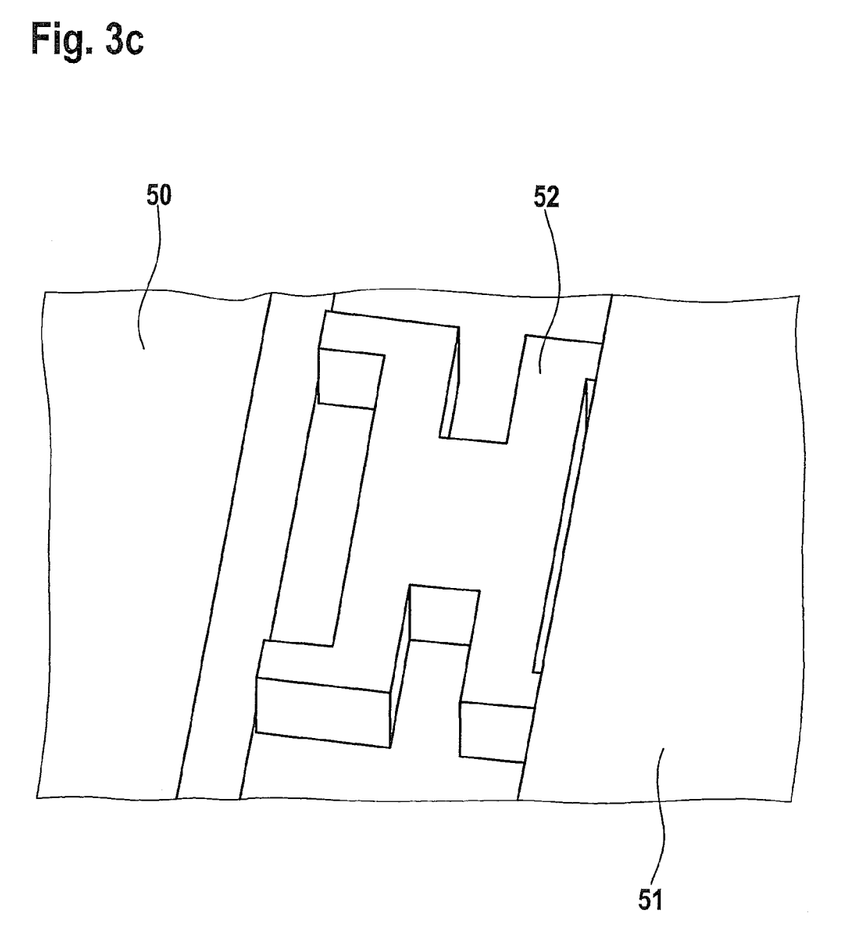

FIGS. 3a, 3b and 3c are schematic views and detailed views of a rotation rate sensor according to a second exemplary embodiment of the present invention, the second exemplary embodiment essentially being equal to the first exemplary embodiment illustrated in FIG. 1a, by contrast, rotation rate sensor 1 according to the second exemplary embodiment having no intermediate sections 44, and seismic masses 50, 51 not being composites of first and second mass elements 53, 54. Force transmission elements 40 in each case have for each seismic mass 50, 51 extensions 42, which project from force transmission elements 40 in the direction of seismic masses 50, 51 and between which a corresponding additional extension 56 of respective seismic mass 50, 51 is situated. Between the two extensions 42 and additional extension 56, in each case, drive springs 41 developed as leaf springs are developed. A detailed view of this suspension is illustrated in FIG. 3b. Seismic mass 50 is connected spring-elastically to adjacent additional seismic masses 51 via a spring region 52, which is shown in detail in FIG. 3c. By contrast to the first exemplary embodiment, moreover, detection electrodes 61 are not developed radially to detection axis 101, but instead are developed parallel to drive axis 102. Furthermore, rotation rate sensor 1 has two additional drive springs 30', which each engage with force transmission elements 40 in the region of middle vibration node 71.

What is claimed is:

1. A rotation rate sensor, comprising:
a substrate including a main extension plane;
force transmission elements movably fastened to the substrate using detection springs; and
a seismic mass, the seismic mass being suspended over the force transmission elements movably relative to the substrate such that the seismic mass is excited, using a drive unit, to a drive vibration about a drive axis that is parallel to the main extension plane, and when a rotation rate that extends in parallel to the main extension plane and perpendicularly to the drive axis is present, the seismic mass is excited to a detection vibration about a detection axis that is perpendicular to the main extension plane as a result of Coriolis forces;
wherein the detection springs are connected to the force transmission elements in a region of vibrational nodes.

2. The rotation rate sensor according to claim 1, wherein at least one of (a) the force transmission elements are connected to the seismic mass via drive springs such that the force transmission elements are excited by the drive vibration of the seismic mass to a standing wave having the vibrational nodes, and (b) the force transmission elements are connected to the seismic mass in a region of the drive axis.

3. The rotation rate sensor according to claim 1, further comprising:
at least one additional adjacent seismic mass, which is excitable, using an additional drive unit, to an additional drive vibration about an additional drive axis that is parallel to the drive axis, the drive vibration and the additional drive vibration being aligned in phase opposition to each other, the seismic mass and the additional seismic mass being preferably connected to one another by at least one spring region in a spring-elastic manner.

4. The rotation rate sensor according to claim 2, wherein the drive spring includes a spiral spring, which extends along a sensing direction, that is essentially parallel to the rotation rate, between the force transmission elements and the seismic mass or between an extension of the force transmission elements and an additional extension of the seismic mass.

5. The rotation rate sensor according to claim 2, wherein the detection springs include spiral springs, whose one end region engages with the vibrational nodes of the standing wave on the force transmission elements and whose other end region engages at an anchoring point that is fixed to the substrate, the detection springs being softer with respect to bending about a bending axis, that is parallel to the detection axis, than with respect to bending about a bending axis that is parallel to the main extension plane, the detection springs being situated preferably essentially radially to the detection axis.

6. The rotation rate sensor according to claim 1, wherein the seismic mass includes a first mass element and a second mass element, the drive axis running between the first and second mass elements, the first and second mass elements being connected to each other via a connecting spring.

7. The rotation rate sensor according to claim 1, wherein the rotation rate sensor has a frame, which includes two force transmission elements extending parallel to a sensing direction and at least one intermediate section extending parallel to the drive axis between the two force transmission elements.

8. The rotation rate sensor according to claim 1, wherein the force transmission elements are connected to a detection structure, which is configured to a detection of the detection vibration, the detection structure including detection electrodes that are rigidly connected to the force transmission elements and including fixed electrodes, fixed to the substrate, that are associated with the detection electrodes.

9. A method for operating a rotation rate sensor comprising a substrate including a main extension plane, force transmission elements movably fastened to the substrate using detection springs, and a seismic mass, the seismic mass being suspended over the force transmission elements movably relative to the substrate such that the seismic mass is excited, using a drive unit, to a drive vibration about a drive axis that is parallel to the main extension plane, and when a rotation rate that extends in parallel to the main extension plane and perpendicularly to the drive axis is present, the seismic mass is excited to a detection vibration about a detection axis that is perpendicular to the main extension plane as a result of Coriolis forces, wherein the detection springs are connected to the force transmission elements in a region of vibrational nodes, the method comprising:
exciting the seismic mass to the drive vibration about the drive axis using the drive unit, the drive vibration being coupled into the force transmission elements such that a standing wave is produced in the force transmission elements, the force transmission elements being fixed to the vibrational nodes of the standing wave using the detection springs.

10. The method according to claim 9, further comprising:
detecting the detection vibration of the seismic mass about the detection axis brought about by Coriolis forces capacitively using a detection structure that is rigidly connected to the force transmission elements.

11. The rotation rate sensor according to claim 6, wherein the first and second mass elements each are connected to the force transmission elements via a drive spring.

12. The rotation rate sensor according to claim 7, wherein the intermediate section is situated between the first and second mass elements.

13. The rotation rate sensor according to claim 8, wherein the detection electrodes are situated essentially parallel to the drive axis or essentially radially to the detection axis.

14. A rotation rate sensor, comprising:
a substrate extending in a main extension plane;
a drive unit;
force transmission elements movably fastened to the substrate via detection springs;
a seismic mass that is suspended between the force transmission elements and is movable relative to the substrate; and
a detection element;
wherein:
the drive unit is configured to excite the seismic mass into a drive mode in which the seismic mass rotationally vibrates with a drive vibration about a drive axis that is parallel to the main extension plane;
the drive unit and the force transmission elements are coupled to each other such that the drive vibration of the seismic mass causes the force transmission elements to be excited to a standing wave with vibrational nodes;
the detection springs are connected to the force transmission elements at the vibrational nodes, so that the excitation of the force transmission elements to the standing wave causes essentially no movement of the detection springs;
the seismic mass is configured to, when in the drive mode, respond to a Coriolis force generated by a rotation rate about an axis that is perpendicular to the drive axis and is parallel to the main extension plane by rotationally vibrating about a detection axis that is perpendicular to the main extension plane; and
the rotational vibration of the seismic mass about the detection axis causes the force transmission elements to a vibration which the detection element is configured to detect.

* * * * *